(12) United States Patent
Kobayashi (10) Patent No.: US 8,346,427 B2
(45) Date of Patent: Jan. 1, 2013

(54) VEHICLE TRAVEL SUPPORT DEVICE, VEHICLE, AND VEHICLE TRAVEL SUPPORT PROGRAM WITH IMAGING DEVICE FOR RECOGNIZING A TRAVEL AREA

(75) Inventor: Sachio Kobayashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 225 days.

(21) Appl. No.: 12/867,643

(22) PCT Filed: Jan. 9, 2009

(86) PCT No.: PCT/JP2009/000074
§ 371 (c)(1),
(2), (4) Date: Aug. 13, 2010

(87) PCT Pub. No.: WO2009/113225
PCT Pub. Date: Sep. 17, 2009

(65) Prior Publication Data
US 2011/0010021 A1    Jan. 13, 2011

(30) Foreign Application Priority Data

Mar. 12, 2008    (JP) ................................. 2008-062279

(51) Int. Cl.
*G05D 1/00*    (2006.01)
(52) U.S. Cl. ........................... 701/28; 382/104; 348/119
(58) Field of Classification Search .................... 701/28; 382/104; 348/119, 148
See application file for complete search history.

(56) References Cited

U.S. PATENT DOCUMENTS

| | | | |
|---|---|---|---|
| 6,973,380 B2 | 12/2005 | Tange et al. | |
| 7,265,657 B2 | 9/2007 | Nishida et al. | |
| 2004/0183663 A1 | 9/2004 | Shimakage | |

(Continued)

FOREIGN PATENT DOCUMENTS

EP    1 603 097 A2    12/2005

(Continued)

OTHER PUBLICATIONS

Jochem et al., "Vision Based Intersection Navigation," Intelligent Vehicles Symposium, Proceedings of the 1996 IEEE Tokyo, Japan, pp. 391-396, XP 010209769, Sep. 19, 1996.*

*Primary Examiner* — Gerald McClain
(74) *Attorney, Agent, or Firm* — Carrier Blackman & Associates, P.C.; William D. Blackman; Joseph P. Carrier (57) ABSTRACT

A vehicle travel support device is capable of properly controlling the operation of a steering device and the like from the viewpoint of supporting the travel of a vehicle stably even in a situation where a travel area is inappropriately demarcated by right and left lane marks at both sides. A virtual travel area can be set as a travel area when a first condition is satisfied, that is, when the separation between the right and the left lane marks in width direction of a road increases to an inappropriate extent from the viewpoint of demarcating the travel area because the separation therebetween gradually increases as the distance from the vehicle increases. The operation of a steering device and the like is controlled such that the vehicle will not depart from the virtual travel area set as the travel area.

5 Claims, 7 Drawing Sheets

U.S. PATENT DOCUMENTS

| | | |
|---|---|---|
| 2005/0273260 A1* | 12/2005 | Nishida et al. ............... 701/301 |
| 2006/0233425 A1* | 10/2006 | Kobayashi et al. ........... 382/106 |
| 2006/0239509 A1 | 10/2006 | Saito |
| 2007/0203617 A1 | 8/2007 | Haug |
| 2009/0024278 A1 | 1/2009 | Kondo et al. |
| 2009/0118994 A1 | 5/2009 | Mori et al. |
| 2009/0271071 A1 | 10/2009 | Buerkel et al. |

FOREIGN PATENT DOCUMENTS

| | | |
|---|---|---|
| JP | 10-261065 A | 9/1998 |
| JP | 11-232467 A | 8/1999 |
| JP | 2000-105898 A | 4/2000 |
| JP | 2000-207692 A | 7/2000 |
| JP | 2001-023094 A | 1/2001 |
| JP | 2001-344687 A | 12/2001 |
| JP | 2002-002427 A | 1/2002 |
| JP | 2003-252149 A | 9/2003 |
| JP | 2003-327012 A | 11/2003 |
| JP | 2004-178159 A | 6/2004 |
| JP | 2005-165708 A | 6/2005 |
| JP | 2005-178743 A | 7/2005 |
| JP | 2006-264405 A | 10/2006 |
| JP | 2007-004669 A | 1/2007 |
| JP | 2007-099124 A | 4/2007 |
| JP | 2007-164636 A | 6/2007 |
| WO | 2008/043591 A1 | 4/2008 |

* cited by examiner

VEHICLE TRAVEL SUPPORT DEVICE, VEHICLE, AND VEHICLE TRAVEL SUPPORT PROGRAM WITH IMAGING DEVICE FOR RECOGNIZING A TRAVEL AREA

PRIORITY CLAIM

The present application is based on and claims the priority benefit of Japanese Patent Application 2008-062279 filed on Mar. 12, 2008, the contents of which are incorporated herein by reference in its entirety.

BACKGROUND OF THE INVENTION

Field of the Invention

The present invention relates to a device supporting a vehicle in travelling according to an image obtained through an imaging device mounted in the vehicle, and the like.

There has been disclosed an art (refer to Japanese Patent Laid-open No. 2001-023094) in which a disposition of a lane mark such as a traffic lane or a raised road marker provided on a road where a vehicle is travelling according to an image photographed by a camera mounted in the vehicle is recognized. There has also been disclosed an art which controls an operation of a steering device and the like to prevent the vehicle from departing from a travel area sandwiched by lane marks of which dispositions have been recognized at a left side and a right side of the vehicle in the travelling direction, respectively (refer to Japanese Patent Laid-open No. 2006-264405).

However, in a situation when at least one lane mark of the left and right lane marks becomes unable to be recognized during the travel, if the demarcation of the travel area and the operation control on the steering device and the like are stopped, the travel of the vehicle may not be supported. For example, when the left and right lane marks disposed on a road before a junction are extending continuously through the junction to a different divergent road after the junction, if the operation control on the steering device and the like is stopped in the midway after the vehicle has entered one of the divergent roads, the travel of the vehicle may not be supported.

SUMMARY OF THE INVENTION

The present invention has been accomplished in view of the aforementioned problems, and it is therefore an object of the present invention to provide a vehicle travel support device capable of properly controlling the operation of a steering device and the like from the viewpoint of supporting the travel of a vehicle stably even in a situation where a travel area is inappropriately demarcated by right and left lane marks at both sides, and the like.

A first aspect of the present invention provides a vehicle travel support device which comprises a first processing element configured to recognize the presence and the disposition of a lane mark on a road where a vehicle is traveling according to an image of the road obtained through an imaging device mounted on the vehicle and recognize a travel area demarcated by a left lane mark and a right lane mark disposed with a separation in the width direction of the road; and a second processing element configured to control an operation of either one or both of a steering device and a braking device mounted in the vehicle to prevent the vehicle from departing from the travel area recognized by the first processing element, wherein the first processing element is configured to recognize a virtual travel area as the travel area when a first condition is satisfied, the first condition is defined as a condition in which the separation between the left lane mark and the right lane mark in the width direction of the road becomes wider gradually to an inappropriate extend from the viewpoint of demarcating the travel area as the distance from the vehicle is increasing, and the virtual travel area is demarcated by one lane mark of the left and the right lane marks used as a reference lane mark extending along the road where the vehicle is travelling at one side and a virtual lane mark disposed with a separation from the reference lane mark in the width direction of the road at the other side.

According to the vehicle travel support device of the first aspect of the present invention, when the first condition is satisfied, namely, the separation between the left lane mark and the right lane mark in the width direction of the road becomes wider gradually an inappropriate extend from the viewpoint of demarcating the travel area as the distance from the vehicle is increasing, the virtual travel area can be set as the travel area. The virtual travel area refers to an area demarcated by one lane mark of the left and the right lane marks used as a reference lane mark extending along the road where the vehicle is travelling at one side and a virtual lane mark disposed with a separation from the reference lane mark in the width direction of the road at the other side. In other words, despite that only a single lane mark is present at one side of a scheduled travel road for the vehicle, the single lane mark is used as the reference lane mark and a lane mark is assumed to demarcate the travel area with the reference lane mark. This is based on the consideration that when the first condition is satisfied, (1) since the road extends after diverged in the travelling direction of the vehicle, the left and right lane marks disposed on the road before divergence extend to different diverged roads respectively and (2) there is a high probability that only one lane mark of the lane marks extends on each diverged road continuously at a single side thereof. The operation of either one or both of the steering device and the braking device (referred to as the steering device and the like where appropriate) is controlled to prevent the vehicle from departing from the virtual travel area which is set as the travel area. Thereby, when the vehicle enters from a road with lane marks disposed on both sides thereof before divergence into a diverged road with only a single lane mark disposed at one side thereof, the operation control on the steering device and the like can be prevented from being interrupted immediately which causes the support on the travel of the vehicle unavailable. In other words, the operation of the steering device and the like can be properly controlled from the viewpoint of supporting the travel of the vehicle stably even in a situation where the travel area is inappropriately demarcated by the right and left lane marks at both sides thereof.

It should be noted that in the present invention a component "recognizes" information" means that the component performs a possible information process on a piece of information to prepare the piece of information ready for other information process, for example, the component searches the piece of information in a database or retrieves the piece of information from a storing unit such as a memory; measures, calculates, estimates, determines the piece of information according to an output signal from a sensor or the like; and stores in memory or the like the determined information or the like.

A second aspect of the present invention is dependent on the vehicle travel support device of the first aspect of the present invention, wherein the first processing element recognizes the virtual travel area as the travel area when a second condition is satisfied, the second condition is defined as a condition containing a part of or the entire part of requirements that a curvature of the reference lane mark is equal to or smaller than a first threshold around a point where the first condition is satisfied, the rate of change of the curvature is equal to or smaller than a second threshold around the point where the first condition is satisfied, and a deviation from the reference lane mark in the width direction of the road is equal to or smaller than a third threshold around the point where the first condition is satisfied.

According to the vehicle travel support device of the second aspect of the present invention, when the second condition is satisfied, in other words, on consideration of the rate of change of the curvature and the like of the reference lane mark around a point where the first condition is satisfied, when the reference lane mark is sufficiently reliable to be used as a reference for demarcating one side of the travel area laterally, the virtual travel area is recognized as the travel area. Thereafter, as mentioned in the above, the operation of the steering device and the like is controlled to prevent the vehicle from departing from the virtual travel area which is set as the travel area. Thereby, the operation of the steering device and the like can be properly controlled from the viewpoint of supporting the travel of the vehicle stably even in a situation where the travel area is inappropriately demarcated by the right and left lane marks at both sides thereof.

A third aspect of the present invention is dependent on the vehicle travel support device of the first aspect of the present invention, wherein the first processing element evaluates a reliability of the reference lane mark, and sets the virtual travel area as the travel area when a third condition is satisfied, and the third condition is defined as a condition in which the reliability of the reference lane mark is equal to or greater than a reference value.

According to the vehicle travel support device of the third aspect of the present invention, when the third condition is satisfied, in other words, when the reliability of the reference lane mark is equal to or greater than the reference value, the virtual travel area demarcated by the reference lane mark and the virtual lane mark at both sides is set as the travel area. Thereafter, as mentioned in the above, the operation of the steering device and the like is controlled to prevent the vehicle from departing from the virtual travel area which is set as the travel area. Thereby, the operation of the steering device and the like can be properly controlled from the viewpoint of supporting the travel of the vehicle stably even in a situation where the travel area is inappropriately demarcated by the right and left lane marks at both sides thereof.

A fourth aspect of the present invention is dependent on the vehicle travel support device of the third aspect of the present invention, wherein the first processing element evaluates a function of either one or both of a recognizable distance of the reference lane mark from the vehicle and the number of edge points of the reference lane mark as the reliability of the reference lane mark.

According to the vehicle travel support device of the fourth aspect of the present invention, when the reference lane mark can be recognized relatively far from the vehicle or the number of the edge points of the recognized reference lane mark is relatively more, the reliability of the reference lane mark is evaluated higher. On the other hand, when the reference lane mark can only be recognized relatively close to the vehicle or the number of the edge points of the recognized reference lane mark is relatively less, the reliability of the reference lane mark is evaluated lower. When the reliability of the reference lane mark is evaluated higher, as mentioned in the above, the operation of the steering device and the like is controlled to prevent the vehicle from departing from the virtual travel area which is set as the travel area. Thereby, the operation of the steering device and the like can be properly controlled from the viewpoint of supporting the travel of the vehicle stably even in a situation where the travel area is inappropriately demarcated by the right and left lane marks at both sides thereof.

A fifth aspect of the present invention is a vehicle provided with an imaging device, a steering device, a braking device and the vehicle travel support device of the first aspect of the present invention.

According to the vehicle of the fifth aspect of the present invention, the operation of the steering device and the like can be properly controlled from the viewpoint of supporting the travel of the vehicle stably even in a situation where the travel area is inappropriately demarcated by the right and left lane marks at both sides thereof. In other words, when the left and right lane marks disposed on a road before a junction are extending continuously through the junction to a different divergent road after the junction, the operation control on the steering device and the like can be prevented from getting stopped in the midway after the vehicle has entered one of the divergent roads, thereby, the situation that the travel of the vehicle may not be supported can be prevented.

A sixth aspect of the present invention is a vehicle travel support program causing a vehicular computer to function as the vehicle travel support device of the first aspect of the present invention.

According to the vehicle travel support program of the sixth aspect of the present invention, the vehicular computer is caused to function as the vehicle travel support device for controlling the operation of the steering device and the like properly from the viewpoint of supporting the travel of the vehicle stably even in a situation where the travel area is inappropriately demarcated by the right and left lane marks at both sides thereof.

DETAILED DESCRIPTION OF THE PREFERRED EMBODIMENTS

An embodiment of a vehicle travel support device and the like according to the present invention will be described with reference to the drawings.

Figure 1:
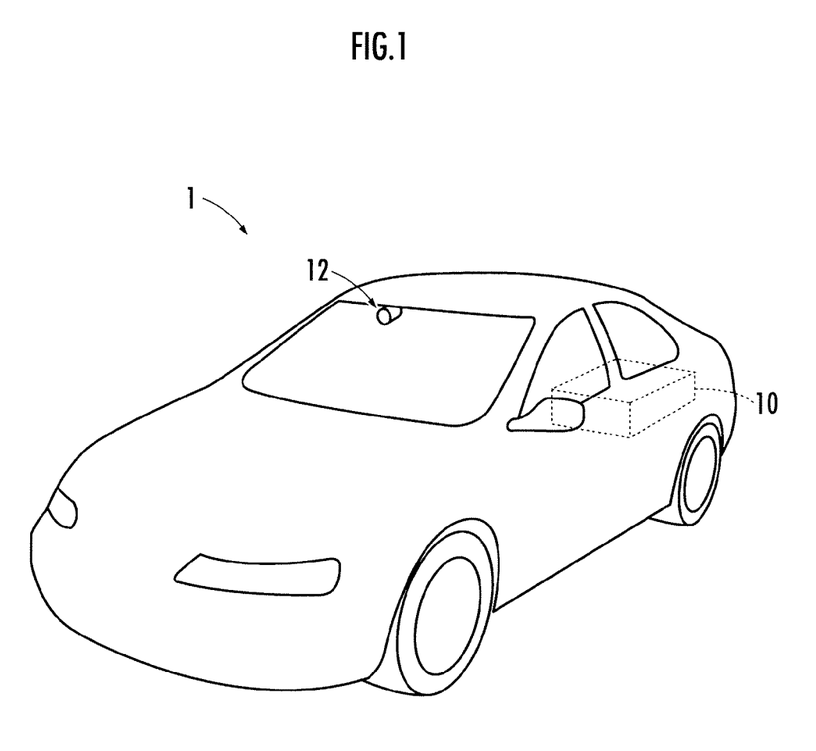
FIG. 1 is a configuration diagram illustrating a vehicle of the present invention.
Figure 2:
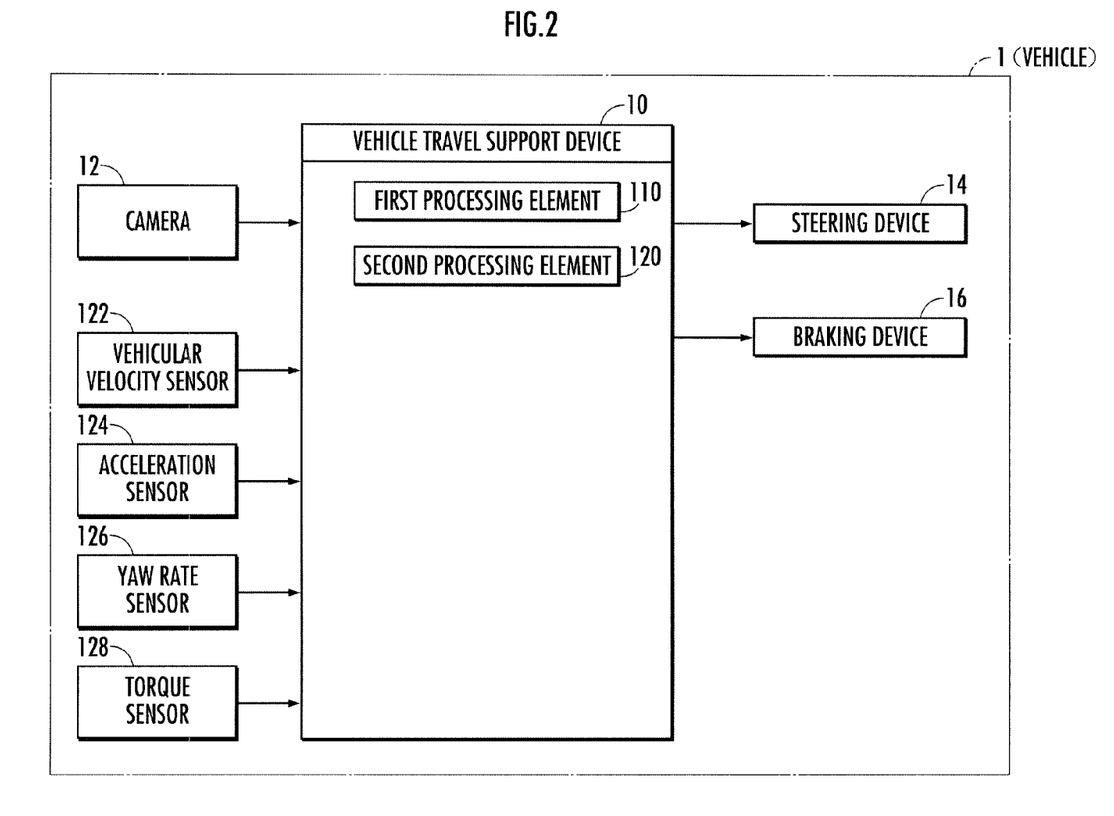
FIG. 2 is a configuration diagram illustrating a vehicle travel support device of the present invention.

A vehicle (four-wheeled automobile) illustrated in FIG. 1 and FIG. 2 is mounted with a camera (imaging device) 12 such as a CCD camera, a CMOS image sensor or a near infrared camera, and a vehicle travel support device 10. The camera 12 is fixed in the vehicular compartment to photograph the front side of the vehicle 1 through the windshield. The vehicle 1, as illustrated in FIG. 2, is further disposed with sensors such as a vehicular velocity sensor 122, an acceleration sensor 124, a yaw rate sensor 126 and a torque sensor 128, a steering device 14 and a braking device 16. The vehicular velocity sensor 122, the acceleration sensor 124 and the yaw rate sensor 126 output signals related to a vehicular velocity, an acceleration and a yaw rate of the vehicle 1, respectively. As disclosed in Japanese Patent Laid-open No. 2003-154960, the torque sensor 128 outputs a signal corresponded to a steering torque generated in a pinion connected to a steering wheel via a steering shaft or the like according to an operation on the steering wheel by a driver. The steering device 14 is configured to drive a front-wheel steering mechanism via the actuator according to the operation of the steering wheel. It is acceptable that a rear-wheel steering mechanism is driven by the steering device 14 in place of or in addition to the front-wheel steering mechanism.

The vehicle travel support device 10 is composed of a computer or an ECU (Electrical Control Unit composed of a CPU, a ROM, a RAM and electrical circuits such as an I/O circuit and an A/D conversion circuit and the like). Output signals from the camera 12, the vehicular velocity sensor 122 and the like are input into the vehicle travel support device 10. A vehicle travel support program is retrieved from memory by CPU, and various processes to be described hereinafter are performed according to the retrieved program. The program may be distributed or broadcasted from a server to the vehicle 1 through a network or a satellite at an arbitrary time and stored in the RAM or the like of the computer mounted in the vehicle.

The vehicle travel support device 10 is provided with a first processing element 110 and a second processing element 120.

The first processing element 110 recognizes the presence and the disposition of a lane mark on a road where the vehicle 1 is traveling according to an image of the road obtained through the camera 12 and recognizes a travel area demarcated by the left and right lane marks disposed with a separation in the width direction of the road. When a travel area is inappropriately demarcated by the left and right lane marks, the first processing element 110 recognizes a virtual travel area (to be described hereinafter) as the travel area.

The second processing element 120 controls either one or both of the steering device 14 and the braking device 16 to prevent the vehicle 1 from departing from the travel area recognized by the first processing element 110.

Functions of the vehicle 1 and the vehicle travel support device 10 with the aforementioned configurations will be described hereinafter.

Figure 3:
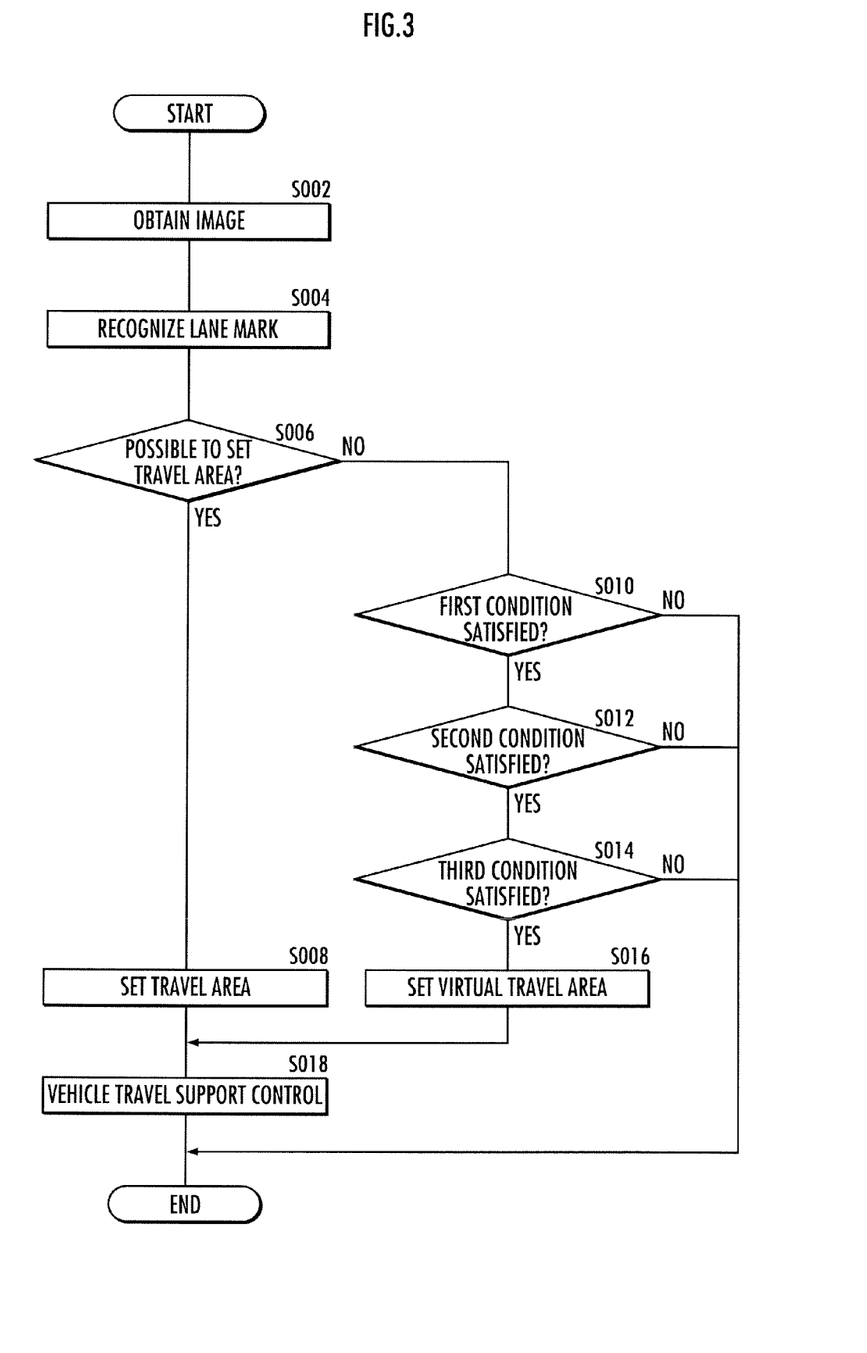
FIG. 3 is a flow chart illustrating functions of the vehicle travel support device of the present invention.
Figure 4A:
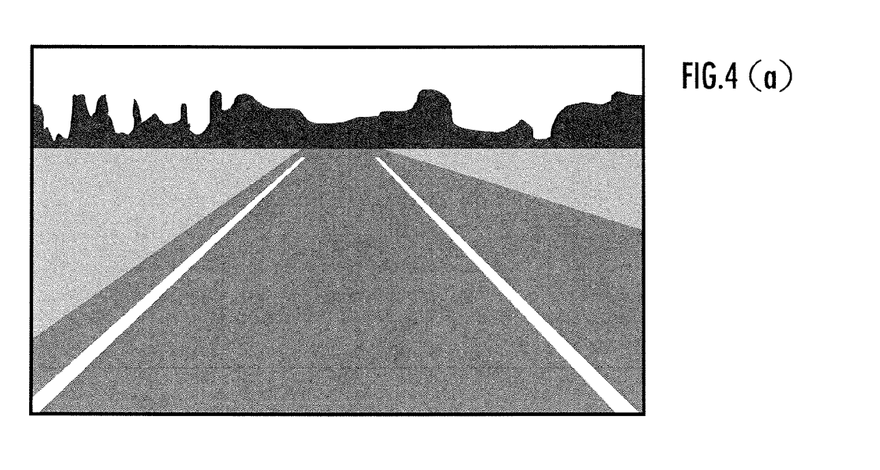
FIG. 4(a) is an explanatory diagram illustrating a road without a junction.
Figure 4B:
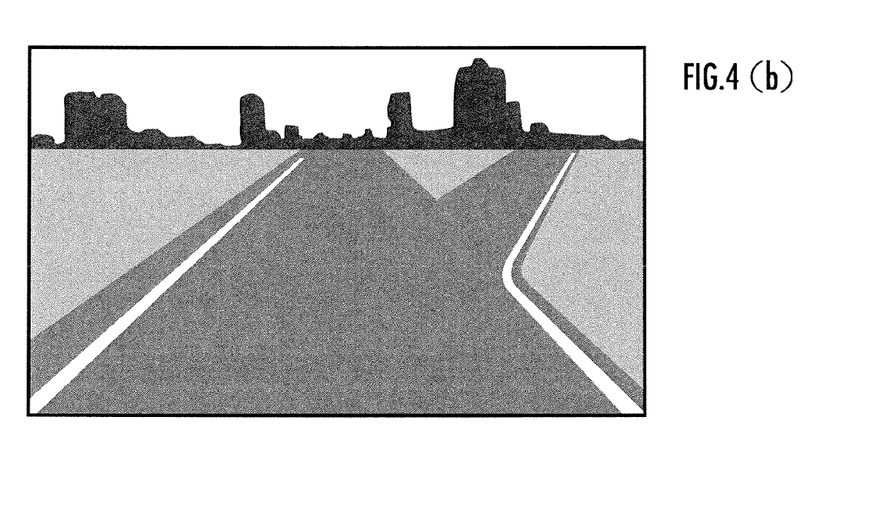
FIG. 4(b) is an explanatory diagram illustrating a road with a junction.

First, an image denoting a situation in front of or in the traveling direction of the vehicle 1 is obtained through the camera 12 (FIG. 3/S002). Accordingly, an image (digital image) as illustrated in FIG. 4(*a*) or FIG. 4(*b*), for example, is obtained. The image in FIG. 4(*a*) illustrates a road extending in front of the vehicle 1 without a junction, and the image in FIG. 4(*b*) illustrates a road diverged in front of the vehicle 1.

Figure 5:
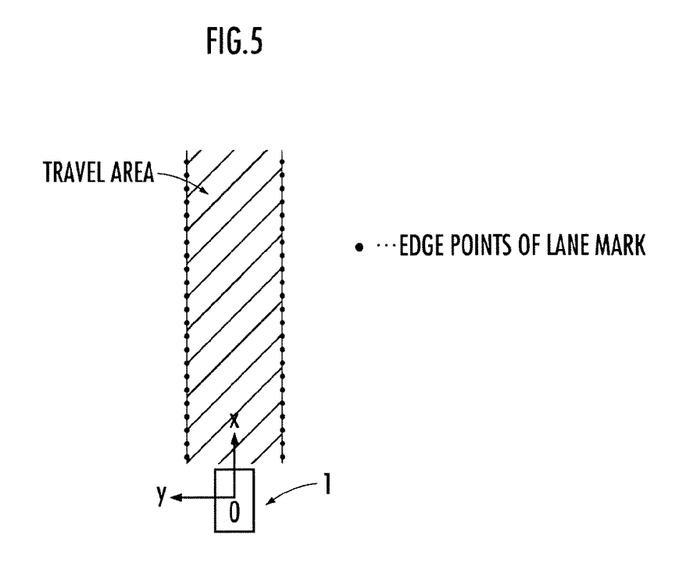
FIG. 5 is an explanatory diagram related to a recognition method of a lane mark and a travel area.
Figure 7:
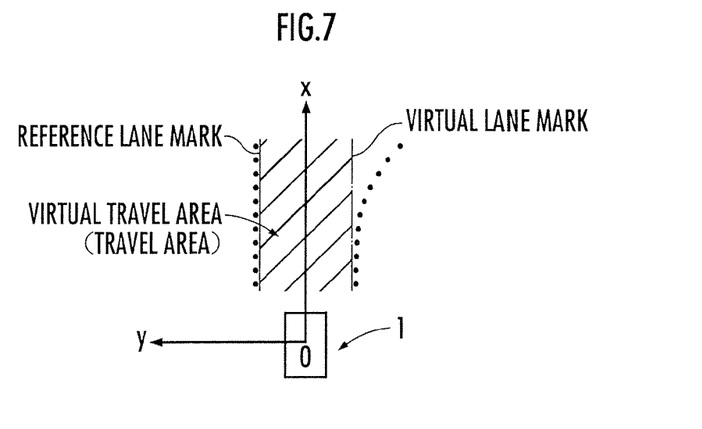
FIG. 7 is an explanatory diagram related to a recognition method of a virtual lane mark and a virtual travel area.

Thereafter, the presence and the disposition of the lane mark in a vehicular coordinate system (a fixed coordinate system with respect to the vehicle 1) or a real spatial coordinate system are recognized by the first processing element 110 on the basis of the obtained image (FIG. 3/S004). According thereto, the positions of edges or edge points (black dots) with greatly varying luminance of a lane mark in the images are recognized. Based on the images illustrated in FIG. 4(*a*) and FIG. 4(*b*), the positions of the edge points are recognized in the vehicular coordinate system via coordinate conversion from the image coordinate system to the vehicular coordinate system, as illustrated in FIG. 5 and FIG. 7. The front side and the left side to the vehicle 1 are defined as +x direction and +y direction, respectively, in the vehicular coordinate system. Lane marks disposed at both sides laterally of the vehicle 1 are recognized respectively as the left and right lane marks. A lane mark such as Botts dots or a traffic line (white line) may be recognized according to an image processing method disclosed in Japanese Patent Laid-Open No. 2006-269605, 2006-309499 or 2006-331193.

Subsequently, whether or not a travel area demarcated by the left and right lane marks at both sides thereof is recognizable is determined by the first processing element 110 (FIG. 3/S006). If it is determined that the travel area demarcated by the left and right lane marks is recognizable (FIG. 3/S006 . . . YES), the travel area is recognized (FIG. 3/S008). Accordingly, as illustrated in FIG. 5, for example, an area (slashed area) demarcated by the left and right lane marks or the edge points thereof at both sides is recognized as the travel area.

Thereafter, a vehicle travel support control is performed by the second processing element 120 to control the operation of the steering device 14 and the like so as to prevent the vehicle 1 from departing from the travel area (FIG. 3/S018).

Figure 8:
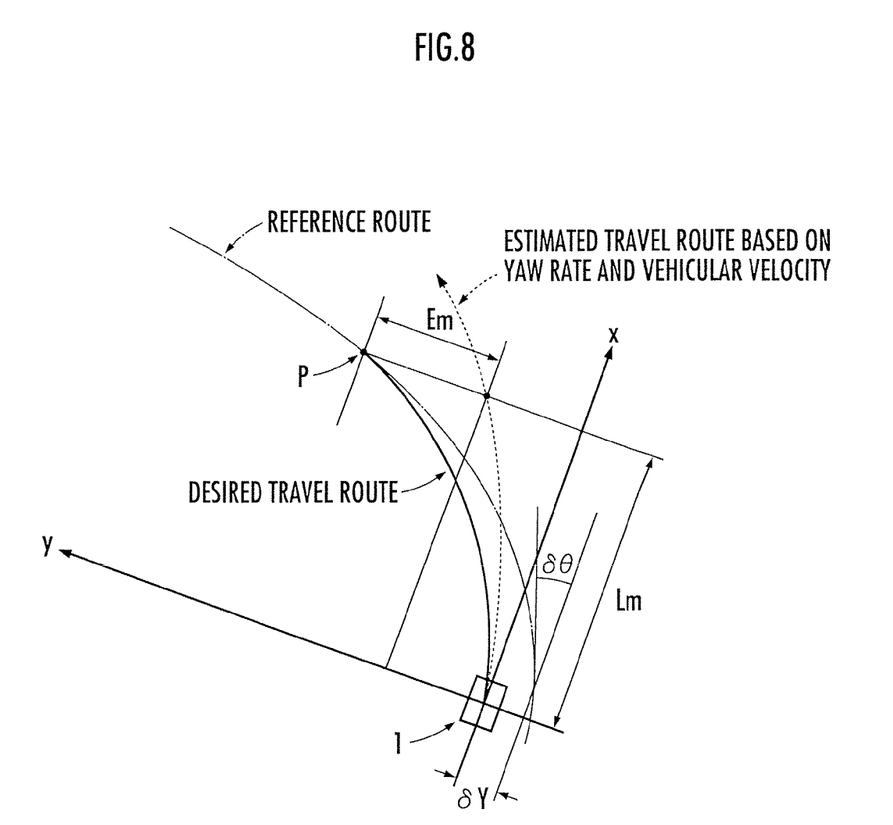
FIG. 8 is an explanatory diagram of a vehicle operating under vehicle travel support control.

In the vehicle travel support control, the vehicular velocity v of the vehicle 1 is calculated according to the output signals from the vehicular velocity sensor 122, then, a distance of point of attention Lm is calculated by multiplying the vehicular velocity v by a predefined temporal constant τ. As illustrated in FIG. 8, a desired position p is set at a position on the reference route with the distance of point of attention Lm away from the vehicle 1 in the front direction (+x direction).

A central line of the travel area recognized by the first processing element 110 or a line offset scarcely from the central line in the lateral direction is defined as the reference route. Moreover, as illustrated in FIG. 8 by a solid line, a route varying at a constant curvature from the present position to the desired position p of the vehicle 1 is set as a desired travel route.

Additionally, a yaw rate of the vehicle 1 is calculated according to the output signals from the yaw rate sensor 126, and an estimated travel route illustrated in FIG. 8 by a dashed line is recognized on the basis of the vehicular velocity v and the calculated yaw rate.

Subsequently, a deviation Em of the estimated travel route from the desired travel route at the position with the distance of point of attention Lm away from the vehicle 1 in the front is calculated.

Thereafter, on the basis of the vehicular velocity v, the distance of point of attention Lm and the deviation Em, a lateral acceleration correction amount Gcmp is calculated according to the expression (1).

$$Gcmp = 2Em \cdot v^2 / (Lm^2 + Em^2) \qquad (1)$$

Thus, the operation of the steering device 14 and the like is controlled to generate the lateral acceleration correction amount Gcmp in the vehicle 1. Accordingly, the behavior of the vehicle 1 is controlled to travel along the desired travel route (refer to the solid line in FIG. 8) other than the estimated travel route (refer to the dashed line in FIG. 8). Thereby, an assist torque is generated in the vehicle 1 to cancel the lateral position deviation δy and the angle deviation δθ so as to support the travel of the vehicle 1 to prevent the vehicle 1 from departing from the travel area.

Figure 6:
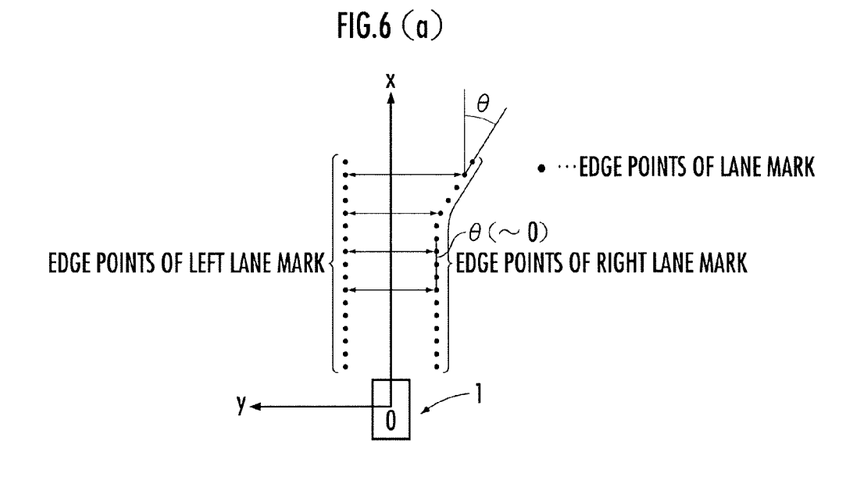
FIG. 6(a) is an explanatory diagram related to a first condition.
FIG. 6(b) is an explanatory diagram related to a second condition.
FIG. 6(c) is an explanatory diagram related to a third condition.

On the other hand, if it is determined that the travel area demarcated by the left and right lane marks is unrecognizable (FIG. 3/S006 . . . NO), whether or not a first condition is satisfied is determined thereafter (FIG. 3/S010). The first condition is defined as a condition in which the separation between the left lane mark and the right lane mark in the width direction of the road becomes wider gradually to an inappropriate extend from the viewpoint of demarcating the travel area as the distance from the vehicle 1 is increasing. For example, as illustrated in FIG. 6(a), when the separation between the left and right lane marks (specifically, the left and right lines formed by the edge points of each lane mark, respectively) in the y direction becomes wider as the x coordinates in the vehicular coordinate system becomes greater, it is determined that the first condition has been satisfied. When an angle θ formed between the left and right lane marks becomes greater as the x coordinates in the vehicular coordinate system becomes greater, it is also acceptable to use it additionally or alternatively as the first condition.

After it is determined that the first condition is satisfied (FIG. 3/S010 . . . YES), whether or not a second condition is satisfied is determined by the first processing element 110 (FIG. 3/S012). The second condition is defined as a condition containing a part of or the entire part of requirements that a curvature of the reference lane mark is equal to or smaller than a first threshold around a point where the first condition is satisfied, the rate of change of the curvature is equal to or smaller than a second threshold around the point where the first condition is satisfied, and a deviation from the reference lane mark in the width direction of the road is equal to or smaller than a third threshold around a point where the first condition is satisfied. The reference lane mark is referred to as a lane mark of the left and right lane marks which extends along the scheduled travel road for the vehicle 1. For example, as illustrated in FIG. 7, when the vehicle 1 is scheduled to travel on a diverged road at the left side, the left lane mark is recognized as the reference lane mark. The scheduled travel road of the vehicle 1 may be recognized according to a recommended route set by a navigation device (not shown) mounted in the vehicle 1 or according to an estimated travel route according to the vehicular velocity, the yaw rate and the like related to the outputs from the vehicular velocity sensor 122, the yaw rate sensor 126 and the like, respectively, of the vehicle 1.

For example, as illustrated in FIG. 6(b), when it is determined that the first condition is satisfied at time k, the curvature or the like of the reference lane mark recognized according to the previous images accumulated up to time k-1 is compared with the curvature or the like of the reference lane mark recognized according to the present image at time k. As illustrated in FIG. 6(b), the reference lane mark in the real spatial coordinate system or the vehicular coordinate system in the past and the reference lane mark in the real spatial coordinate system or the vehicular coordinate system at the present are substantially of a straight line, in other words, the curvature thereof is substantially zero and the rate of change of the curvature is substantially zero, and there is almost no deviation in the width direction of the road, it is determined that the second condition is satisfied.

After it is determined that the second condition is satisfied (FIG. 3/S012 . . . YES), whether or not a third condition is satisfied is determined by the first processing element 110 (FIG. 3/S014). The third condition is defined as a condition in which the reliability of the reference lane mark is equal to or greater than a reference value. Specifically, as illustrated in FIG. 6(c), an increasing function of either one or both of a recognizable distance L of an edge point of the reference lane mark from the vehicle 1 and the number n of the edge points is recognized as the reliability of the reference lane mark. The longer the recognizable distance L of the edge point of the reference lane mark is or the more the number n of the edge points is, the higher the reliability of the reference lane mark will be evaluated.

After it is determined that the third condition is satisfied (FIG. 3/S014 . . . YES), the virtual travel area is recognized by the first processing element 110 as the travel area (FIG. 3/S016).

The virtual travel area is such an area that it is demarcated by the reference lane mark at one side and a virtual lane mark disposed with a separation from the reference lane mark in the width direction of the scheduled travel road of the vehicle 1 at the other side. Thereby, as illustrated in FIG. 7, a slanted area with the left side thereof demarcated by the reference lane mark or the left lane mark (solid line) and the right side thereof demarcated by a virtual lane mark (chain line) with a predefined separation rightward from the reference lane mark is recognized as the virtual travel area. An average or the like of the separations in the width direction of the road in the previously recognized travel area can be used as the separation between the reference lane mark and the virtual lane mark.

Thereafter, as aforementioned, the vehicle travel support control is performed by the second processing element 120 to control the operation of the steering device 14 and the like so as to prevent the vehicle 1 from departing from the virtual travel area which is set as the travel area (FIG. 3/S018). However, if it is determined that neither of the first condition, the second condition and the third condition is satisfied (FIG. 3/S010 . . . NO, S012 . . . NO, S014 . . . NO), the travel support control will not be performed.

According to the vehicle 1 and the vehicle travel support device 10 with the aforementioned configurations, when the first condition is satisfied, namely, the separation between the left lane mark and the right lane mark in the width direction of the road becomes wider gradually an inappropriate extend from the viewpoint of demarcating the travel area as the distance from the vehicle 1 is increasing, a virtual travel area can be set as the travel area (refer to FIG. 3/S010 . . . YES and S016, FIG. 6(a) and FIG. 7).

Specifically, despite that only a single lane mark is present at one side of a scheduled travel road for the vehicle 1, the single lane mark is used as the reference lane mark and a lane mark is virtually imagined to demarcate the travel area with the reference lane mark. This is based on the consideration that when the first condition is satisfied, (1) since an extending road diverges in the travelling direction of the vehicle 1, the left and right lane marks disposed on the road before divergence extend to different roads respectively and (2) there is a high probability that only one lane mark of the lane marks extends on each diverged road continuously at a single side thereof (refer to FIG. 4(b)).

Further, when the second condition is satisfied, in other words, on consideration of the rate of change of the curvature and the like of the reference lane mark around a point where the first condition is satisfied, when the reference lane mark is sufficiently reliable to be used as a reference for demarcating one side of the travel area laterally, the virtual travel area is recognized as the travel area (refer to FIG. 3/S012 . . . YES and S016, and FIG. 6(b)).

Furthermore, when the third condition is satisfied, in other words, when the reliability of the reference lane mark is equal to or greater than the reference value, the virtual travel area demarcated by the reference lane mark and the virtual lane mark at both sides is set as the travel area (refer to FIG.

3/S014 . . . YES and S016, and FIG. 6(c)). The operation of either one or both of the steering device 14 and the braking device 16 is controlled to prevent the vehicle 1 from departing from the virtual travel area which is set as the travel area (refer to FIG. 3/S018 and FIG. 8).

Thereby, when the vehicle 1 enters from a road with lane marks disposed on both sides thereof before divergence into a diverged road with only a single lane mark disposed at one side thereof, the operation control on the steering device 14 and the like can be prevented from being interrupted immediately which makes the support on the travel of the vehicle 1 unavailable. In other words, the operation of the steering device 14 and the like can be properly controlled from the viewpoint of supporting the travel of the vehicle 1 stably even in a situation where the travel area is inappropriately demarcated by the right and left lane marks at both sides thereof.

In the aforementioned embodiment, the virtual travel area is recognized on condition that the first, the second and the third conditions are satisfied (refer to FIG. 3/S010, S012, S014 and S016); however, as another embodiment, the virtual area may be recognized when either the first condition, or the first and the second conditions, or the first and the third conditions are satisfied.

What is claimed is:

1. A vehicle travel support device comprising
   a first processing element configured to recognize the presence and the disposition of a lane mark on a road where a vehicle is traveling according to an image of the road obtained through an imaging device mounted on the vehicle and recognize a travel area demarcated by a left lane mark and a right lane mark disposed with a separation in the width direction of the road; and
   a second processing element configured to control an operation of a steering device or a braking device mounted in the vehicle to prevent the vehicle from departing from the travel area recognized by the first processing element,
   wherein the first processing element is configured to recognize a virtual travel area as the travel area when a first condition is satisfied,
   the first condition is a condition in which the separation between the left lane mark and the right lane mark in the width direction of the road exceeds an expected width at a predetermined distance in front of the vehicle,
   the virtual travel area is demarcated by one of the left lane mark and the right lane mark used as a reference lane mark extending along an intended travel road for the vehicle at a first side thereof and a virtual lane mark disposed with a separation from the reference lane mark in the width direction of the intended travel road at a second side thereof,
   the first processing element is further configured to recognize the virtual travel area as the travel area when a second condition is satisfied, and
   the second condition is a condition in which at least one requirement of a set of requirements is satisfied, wherein the set of requirements includes: a curvature of the reference lane mark being equal to or smaller than a first threshold around a point where the first condition is satisfied, the rate of change of the curvature being equal to or smaller than a second threshold around the point where the first condition is satisfied, and a deviation from the reference lane mark in the width direction of the road being equal to or smaller than a third threshold around a point where the first condition is satisfied.

2. A vehicle travel support program causing a vehicular computer to function as the vehicle travel support device according to claim 1.

3. The vehicle travel support device according to claim 1, wherein
   the first processing element determines a reliability level of the reference lane mark, and sets the virtual travel area as the travel area when a third condition is satisfied, and
   the third condition is a condition in which the reliability level of the reference lane mark is equal to or greater than a reference value.

4. The vehicle travel support device according to claim 3, wherein the first processing element determines the reliability level of the reference lane mark based on a function of at least one of a recognizable distance of the reference lane mark from the vehicle and the number of edge points of the reference lane mark.

5. A vehicle provided with an imaging device, a steering device, a braking device and the vehicle travel support device according to claim 1.

* * * * *